Jan. 20, 1948.  F. S. BOYD  2,434,755
PARACHUTE RELEASE
Filed Jan. 19, 1946
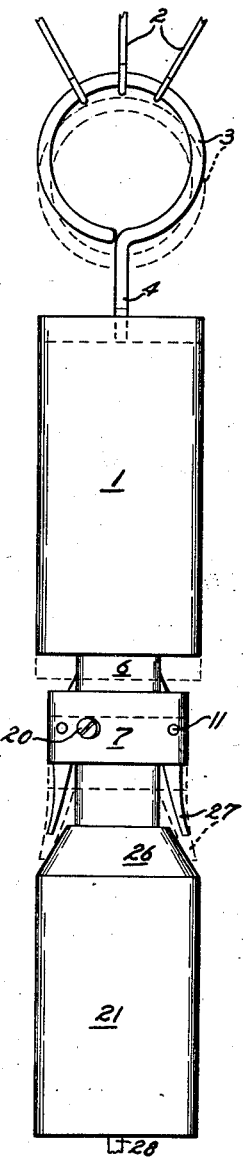
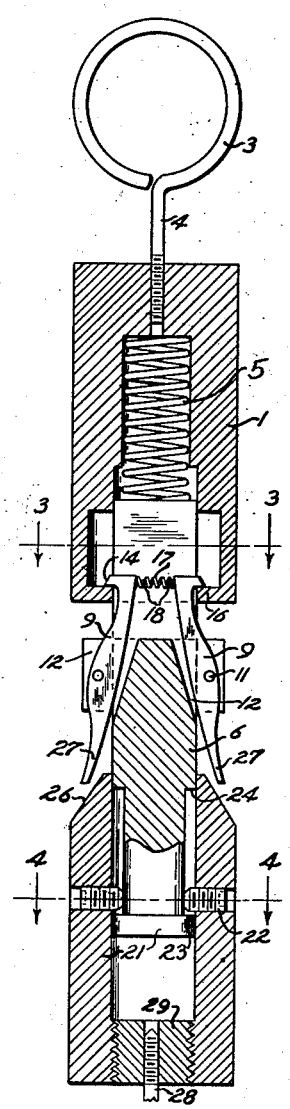
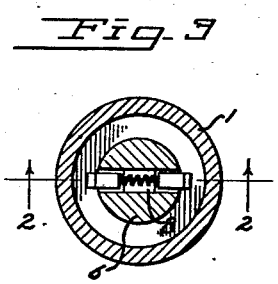
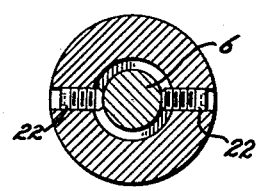
INVENTOR
FRANK S. BOYD
BY
Charles S. Evans
his ATTORNEY Patented Jan. 20, 1948

2,434,755

UNITED STATES PATENT OFFICE 2,434,755

PARACHUTE RELEASE

Frank S. Boyd, Alameda, Calif.

Application January 19, 1946, Serial No. 642,275

5 Claims. (Cl. 294—83)

My invention relates to a device for releasing a load from a parachute as the load is landed.

It is frequently desirable to deliver materials such as medical or food supplies, or mechanical equipment of various kinds, to an inaccessible place by attaching them to a parachute and dropping them from an airplane. The parachute slows the descent of a load of the materials sufficiently to avoid material damage to the load as it lands upon the ground. However, the parachute is frequently carried on by wind after the load strikes the ground. The load may be dragged over the ground for a considerable distance, often causing substantial damage.

It is among the objects of my invention to provide a release which will automatically disconnect the load from the parachute when the load lands upon the ground.

Another object is to provide a load releasing device which will securely suspend a load from a parachute during descent, and which will be operated by the weight and momentum of the parts to release the load instantly upon landing.

The invention possesses other valuable features, some of which with the foregoing will be set forth at length in the following description where that form of the invention which has been selected for illustration in the drawings accompanying and forming a part of the present specification is explained. In said drawings, one form of the invention is shown, but it is to be understood that it is not limited to that form, since the invention as set forth in the claims may be embodied in a plurality of forms.

In the drawings:

Figure 1 is a side elevation of the parachute release of my invention.

Figure 2 is a vertical sectional view, with parts being shown in elevation, the plane of the section being indicated by the line 2—2 of Figure 3.

Figures 3 and 4 are transverse sections, the planes of the sections being indicated by the lines 3—3 and 4—4 respectively in Figure 2.

In terms of broad inclusion, the parachute release of my invention comprises a socket attached to a parachute, and a stud releasably latched to the socket and attached to a load carried by the parachute, the stud being provided with a latch actuating collar movable to automatically release the stud from the socket when the load lands.

In terms of greater detail, the device of my invention comprises a socket 1 attachable to the suspension cords 2 of a parachute by any suitable means, as for example by a ring 3 having a stem 4 threaded into the top of the socket.

A stud 6 is axially movable into the open end of the socket 1 against the resistance of a spring 5 seated within the back of the recess. The stud 6 is provided with an enlarged center body portion 7, and with a slot 8 extending from the upper end of the stud to the enlarged portion 7. A pair of latch arms 9 are pivoted upon pins 11 secured in the body portion 7, the arms 9 being disposed within recesses 12 in the portion 7 and the upper ends of the arms extending into the slot 8. Detents 14 engage the inner edge of an inwardly extending flange 16 upon the lower end of the socket 1. A spring 17 positioned by means of pins 18 normally tends to spread the upper ends of the arms 9 apart and hold them in retaining engagement with the flange 16.

A collar 21 is slidably mounted upon the lower end of the stud 6. Downward movement of the collar is limited by threaded stops 22 engaging shoulders 23 and 24 at spaced points on the stem, the diameter of the stud being reduced to form the shoulders, and to afford clearance permitting limited movement of the collar and stop along the stud. The upper end of the collar 21 is tapered to form an annular cam-like shoulder 26 arranged to engage diverging extensions 27 upon the lower ends of the latch arms 9. Movement of the shoulder 26 between the extensions 27 actuates the latches 9, and causes them to disengage the socket 1.

The stud 6 is attachable to a load to be delivered by parachute, as for example by screws 29 threaded into the body portion 7 of the stud. A stop 28, threaded into a plug 29 in the lower end of the collar, is arranged to strike the ground in advance of the load so that the weight of the load will then move the stud into the collar and force the latch arms 27 onto the shoulder 26. The stop 28 may be of any length and shape to avoid interference with the load.

In operation, the socket 1 is attached to a parachute, and the stud 6 to a load to be delivered thereby. The load then is releasably attached to the parachute by forcing the stud 6 and latch arms 9 into the socket 1, against the resistance of the spring 5. This is accomplished by holding the stud 6 in a raised position with the extensions 27 out of engagement with the shoulder 26. As the stud is forced into the socket 1, the inner ends of the latch arms 9 enter the lower end of the socket. The spring 17 forces the detents 14 apart and into retaining engagement with the flange 16. The pressure exerted by the spring 5 tending to force the stud out of the socket, coupled with the pressure of the spring 17 tending to hold the latch detents 14 in engagement with the flange 16, serves to effectively latch the stud and socket together and to support the load from the parachute as the load drops to the ground.

As the load lands upon the ground, the rod 28 first stops the movement of the stud 6. The weight and momentum of the load causes the stud 6 to move downwardly through the collar 21. The extensions 27 are thereby moved onto the shoulder 26 with sufficient force to displace the detents 14 from the flange 16. The spring 5 instantly forces the stud out of the socket, thereby releasing the load from the parachute, and preventing it from being dragged over the ground in case the parachute is carried on by the wind.

I claim:

1. A parachute release comprising a socket attachable to a parachute, a stud engaging the socket, latch means releasably securing the stud to the socket, a collar movable upon the stud for actuating the latch means to release the stud from the socket, and means for attaching a load to the stud.

2. A parachute release comprising a socket attachable to a parachute, a stud engaging the socket, a spring secured within the socket and compressible therein by the stud, latch means releasably securing the stud to the socket, a collar mounted upon the stud for actuating the latch means to release the stud from the socket, and means for attaching a load to the stud.

3. A parachute release comprising a socket attachable to a parachute, a stud engaging the socket, a spring compressible in the socket by the stud, a spring actuated latch releasably securing the stud to the socket, a collar slidably movable along the stud for moving the latch to stud releasing position, and means for attaching a load to the stud.

4. A parachute release comprising a socket, means for attaching the socket to a parachute, a spring within the socket, a stud movable into the socket against the resistance of the spring, a pair of latch arms pivoted upon the stud and releasably securing the stud to the socket, a collar slidably mounted upon the stud, a shoulder upon the collar movable into actuating engagement with the latch arms, and means for connecting the stud to a load.

5. A parachute release comprising a socket attachable to a parachute, a stud engaging the socket, latch means releasably securing the stud to the socket, a collar movable upon the stud for actuating the latch means to release the stud from the socket, means for attaching a load to the stud, and a stop carried by the collar for engaging the ground in advance of the load.

FRANK S. BOYD.

REFERENCES CITED

The following references are of record in the file of this patent:

UNITED STATES PATENTS

| Number | Name | Date |
|---|---|---|
| 1,845,466 | Williams | Feb. 16, 1932 |
| 2,270,317 | Larson | Jan. 20, 1942 |